UNITED STATES PATENT OFFICE.

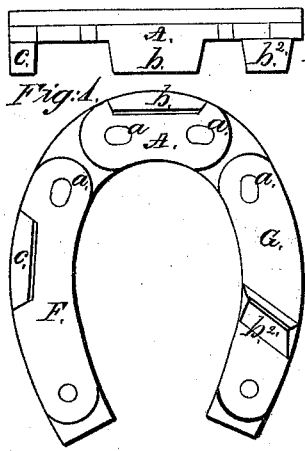
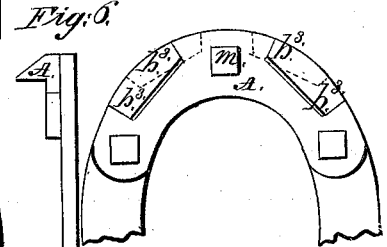
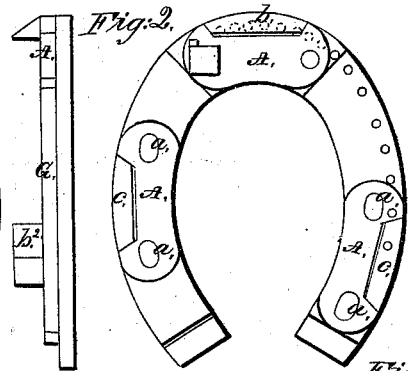
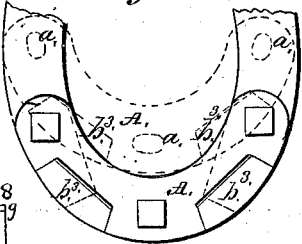
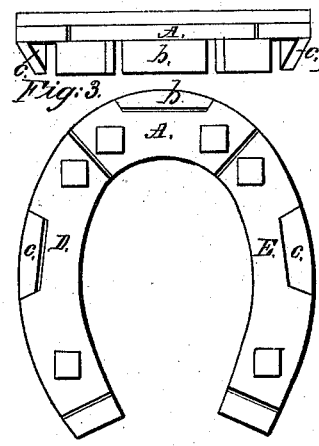
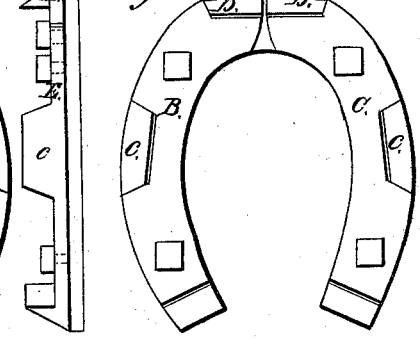

JONATHAN JOHNSON, OF LOWELL, MASSACHUSETTS.

IMPROVEMENT IN HORSESHOES.

Specification forming part of Letters Patent No. 89,774, dated May 4, 1869.

*To all whom it may concern:*

Be it known that I, JONATHAN JOHNSON, of Lowell, in the county of Middlesex and State of Massachusetts, have invented certain new and useful Improvements in Horseshoes, of which the following is a full, clear, and exact description, reference being had to the accompanying drawings, making part of this specification, in which—

Figures 1 and 2 represent each a bottom-side view of a horseshoe as improved by me. Figs. 5, 6, and 7 are respective side elevations. Figs. 9 and 10 are each a forward-end view of the former figures.

My invention consists of sectional and removable calk-plates A F G and calks, $b$ $c$, and $b^2$, each conforming to that part of the shoe to which it is applied, and is provided with a calk firmly welded to the plate, capable of being removed and replaced without changing the form of nailed shoe.

In carrying out my invention, and to apply the different sections of the calk-plates, certain holes are made through the shoe, which is nailed to the foot, each tapped to receive a screw-bolt. The calk-plates are then punched corresponding distances, being but two holes to each plate used in fastening, one of the holes being elongated, so as to enable an easy and ready connection with the nailed shoe.

I make no special claim to the well-known method of fastening one plate to another by means of screws.

The angle calk is peculiarly adapted for completing the bracing position that is necessary to keep the horse's foot from slipping, and is changeable from one side to the other, as may be required in changing the bearing-point nearer the heel or toe upon either side.

Having fully described my invention, what I claim is—

1. The adjustable and removable calk-plate A and calk $b$, constructed so as to be capable of adjustment to any portion of the plate-shoe, in the manner and for the purpose specified.

2. The removable and adjustable calk-plate G and the angle-calk $b^2$, which is adapted for a side calk or a heel-calk.

JONATHAN JOHNSON.

Witnesses:
   JOHN E. CRANE,
   J. S. WHITNEY.